United States Patent [19]

Durda

[11] 4,308,221
[45] Dec. 29, 1981

[54] APPARATUS FOR MIXING A GAS AND A LIQUID

[75] Inventor: Daniel J. Durda, Spring Park, Minn.

[73] Assignee: Aeration Industries, Inc., Chaska, Minn.

[21] Appl. No.: 88,819

[22] Filed: Oct. 26, 1979

Related U.S. Application Data

[63] Continuation of Ser. No. 898,983, Apr. 21, 1978, abandoned.

[51] Int. Cl.³ .............................................. B01F 3/04
[52] U.S. Cl. .................................... 261/87; 209/169; 209/170; 210/221.1; 210/221.2; 261/93; 366/102
[58] Field of Search ................... 261/87, 93; 210/220, 210/219, 221 R, 221 P, 221 M; 209/168-170; 366/102, 147

[56] References Cited

U.S. PATENT DOCUMENTS

| | | | |
|---|---|---|---|
| 1,450,326 | 4/1923 | Maitland | 366/102 |
| 1,505,479 | 4/1924 | Maitland | 366/147 |
| 1,639,828 | 8/1927 | Wheeler et al. | 261/87 |
| 1,745,412 | 2/1930 | Fletcher | 261/93 |
| 1,765,338 | 6/1930 | Jones et al. | 210/220 X |
| 2,061,564 | 11/1936 | Drake et al. | 261/93 |
| 2,063,301 | 12/1936 | Durdin | 261/83 |
| 2,082,759 | 6/1937 | Walker | 261/93 X |
| 2,116,023 | 5/1938 | Gwidt | 261/87 |
| 2,194,037 | 3/1940 | Thuma | 261/36 R |
| 2,232,388 | 2/1941 | Ingall et al. | 209/169 |
| 2,313,654 | 3/1943 | MacLean | 261/93 |
| 2,433,592 | 12/1947 | Booth | 261/93 |
| 2,515,538 | 7/1950 | Wall | 210/169 |
| 2,590,581 | 3/1952 | Shirley | 261/93 |
| 2,609,097 | 9/1952 | Dering | 209/169 |
| 2,641,455 | 6/1953 | Poirot | 261/87 |
| 2,730,493 | 1/1956 | Carlson | 261/93 X |
| 2,928,665 | 3/1960 | Epprecht | 261/87 |
| 2,944,802 | 7/1960 | Daman | 261/87 |
| 3,053,390 | 9/1962 | Wood | 261/93 X |
| 3,092,678 | 6/1963 | Braun | 261/87 X |
| 3,614,072 | 10/1971 | Brodie | 261/93 |
| 3,778,233 | 12/1973 | Blough et al. | 261/87 |
| 3,782,702 | 1/1974 | King | 261/87 |
| 3,975,469 | 8/1976 | Fuchs | 261/87 |
| 4,045,522 | 8/1977 | Nafziger | 261/93 |
| 4,240,990 | 12/1980 | Inhofer et al. | 261/93 |

FOREIGN PATENT DOCUMENTS

| | | | |
|---|---|---|---|
| 776656 | 10/1933 | France. | |
| 466143 | 5/1937 | United Kingdom | 261/87 |

*Primary Examiner*—Gregory N. Clements
*Attorney, Agent, or Firm*—Schuyler, Banner, Birch, McKie & Beckett

[57] ABSTRACT

An apparatus for mixing a gas and a liquid is disclosed. The apparatus is comprised of a hollow outer tube and a hollow inner tube received coaxially within the outer tube. The inner tube is mounted for rotary motion within the hollow interior of the outer tube. A motor is attached to the outer tube adjacent a first end thereof and is drivingly coupled to a first end of the inner tube. The inner tube has a section which extends beyond the second end of the outer tube. A propeller is attached to this section of the inner tube for rotation therewith. The propeller is adapted to be placed in a liquid and to propel the liquid in which the propeller rotates. An inlet is formed in the inner tube for admitting a gas to the hollow interior of the inner tube. A diffusion tube forms a portion of the inner tube and extends beyond the propeller. The diffusion tube has a hollow interior which forms a portion of the hollow interior of the inner tube. The diffusion tube also has an open end for injecting a gas passing through the hollow interior of the inner tube into a liquid in which the propeller is placed. The diffusion tube has a length which is at least fifty percent of the transverse dimension of the propeller.

9 Claims, 12 Drawing Figures

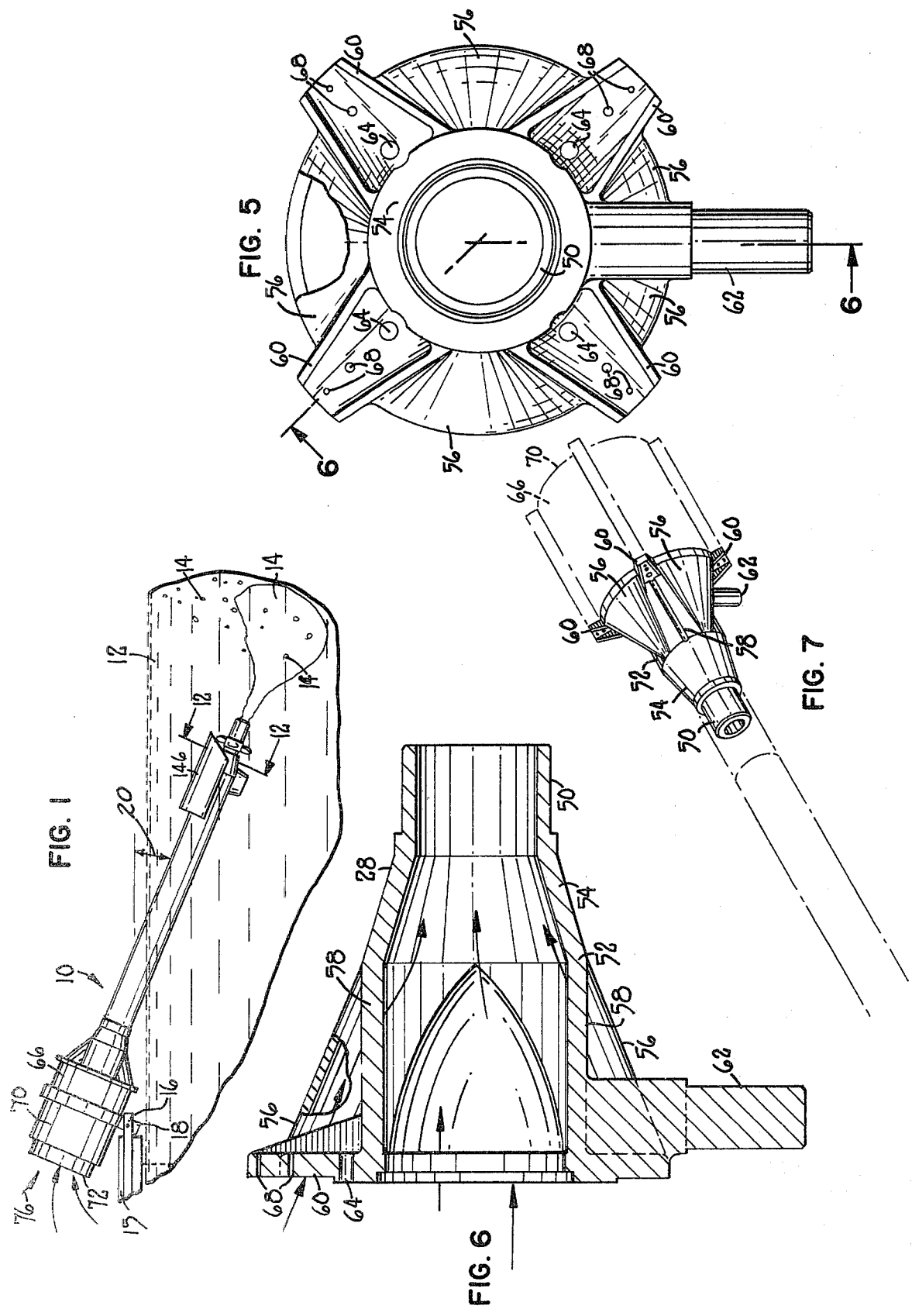

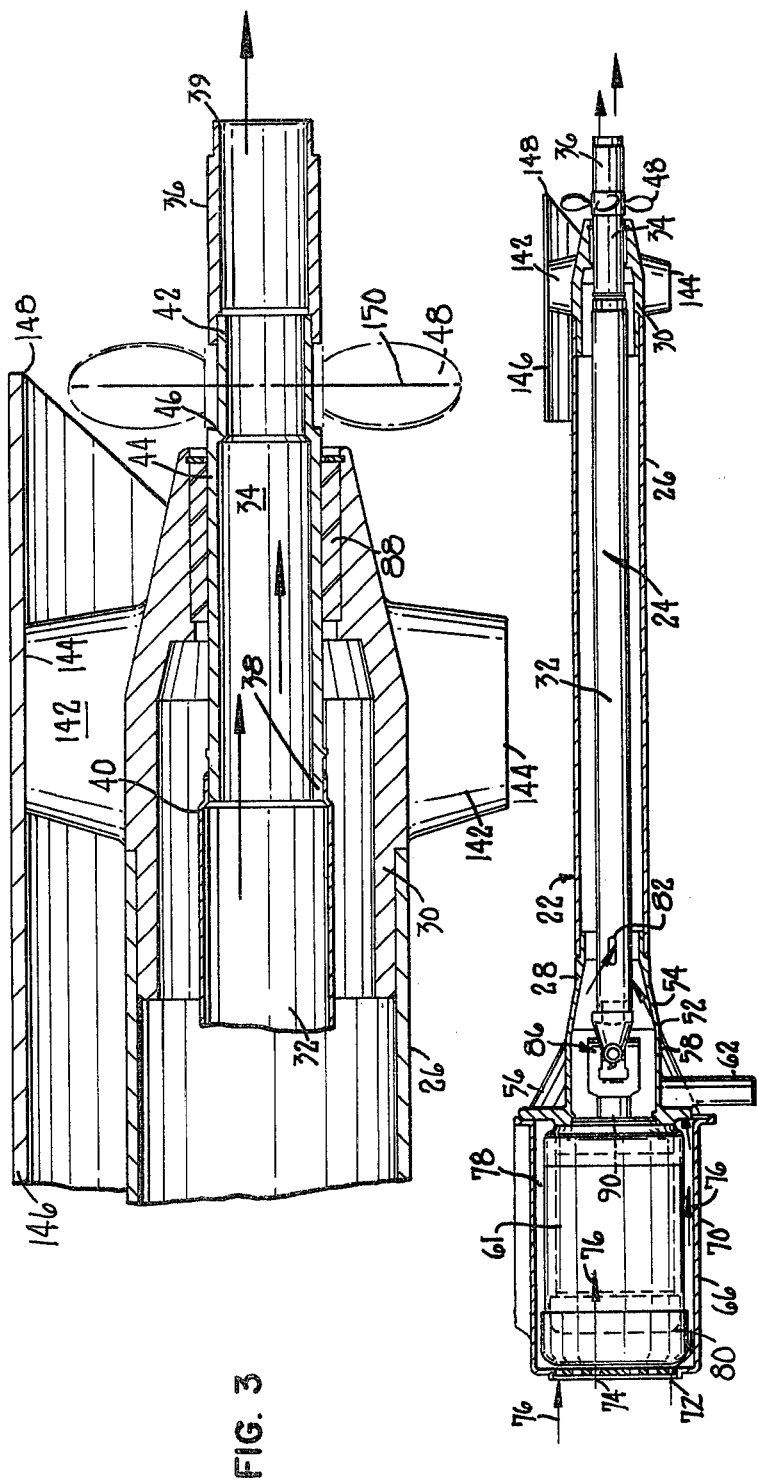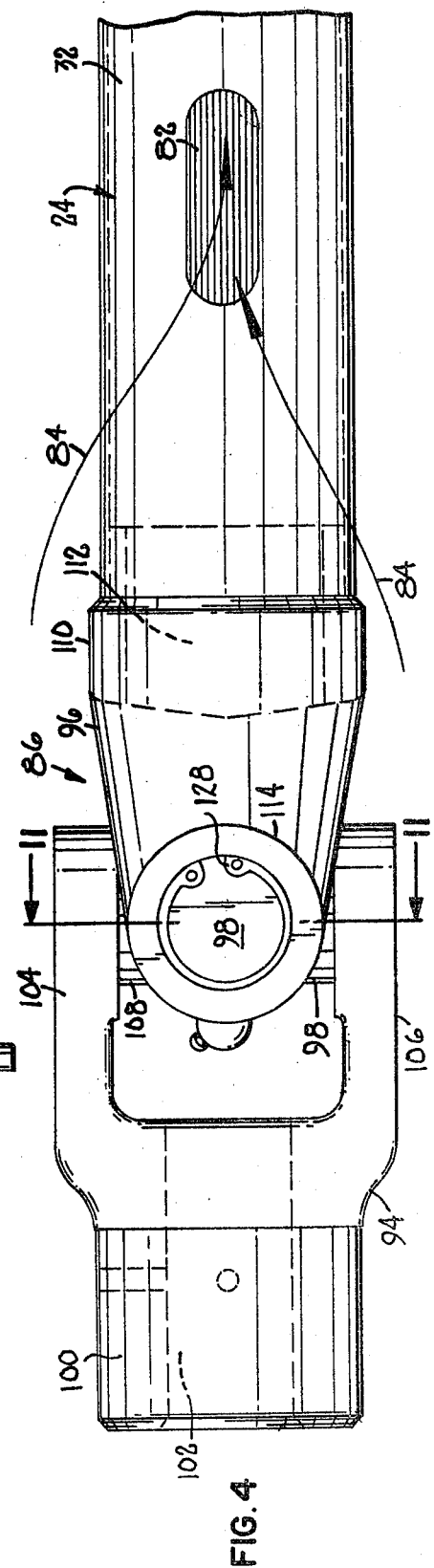
FIG. 3
FIG. 2
FIG. 4

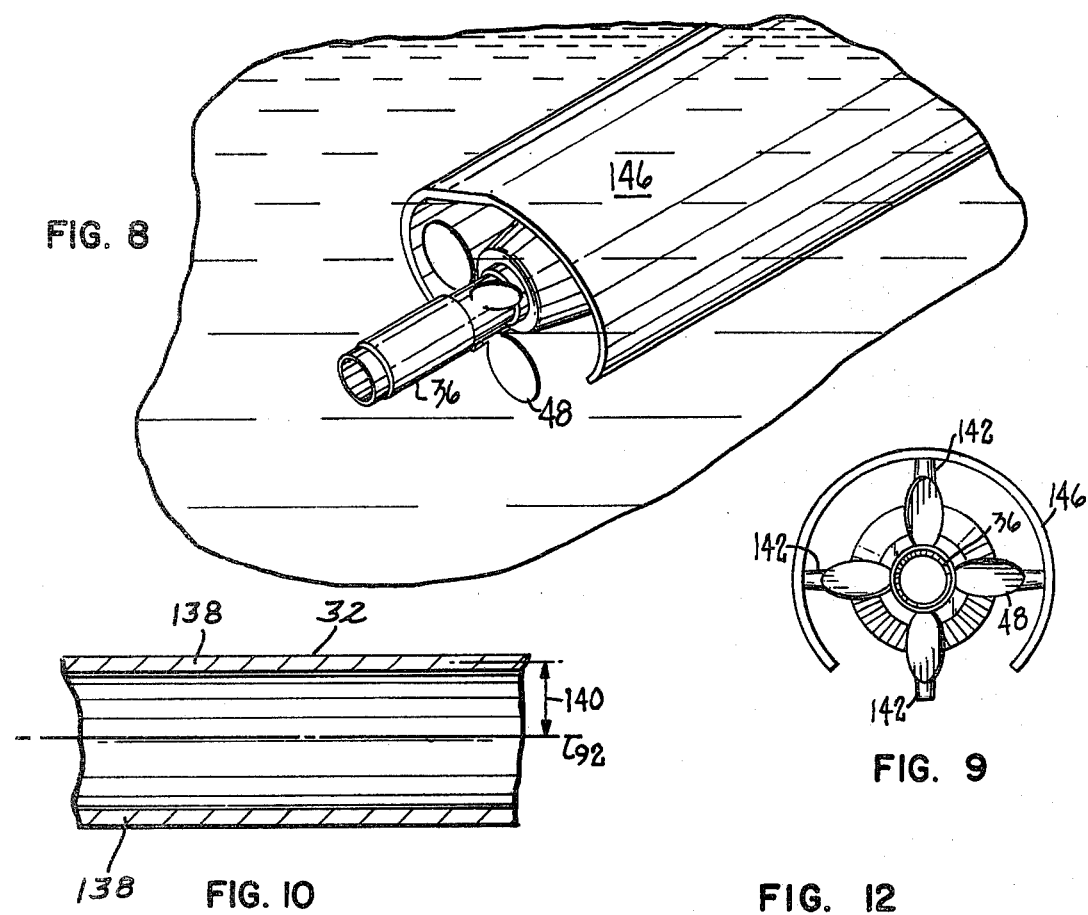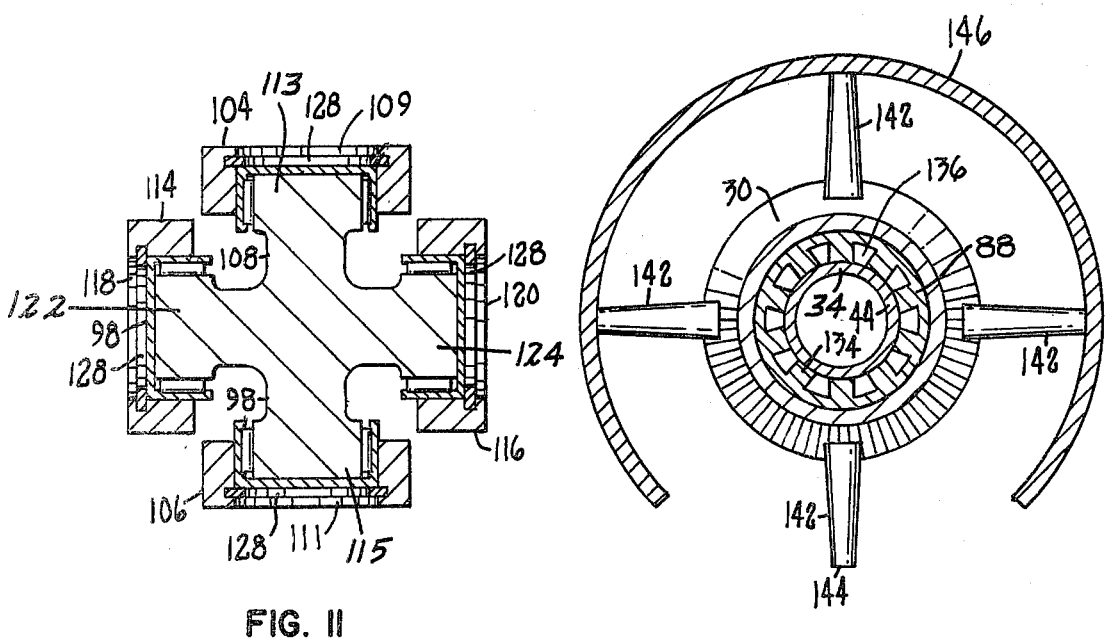

APPARATUS FOR MIXING A GAS AND A LIQUID

This is a continuation of application Ser. No. 898,983, filed Apr. 21, 1978, now abandoned.

BACKGROUND OF THE INVENTION

The present invention relates broadly to apparatus for mixing a gas with a liquid. More particularly, the present invention relates to an apparatus for aerating water in a water treatment process.

Aeration apparatus are utilized in the treatment of water for the purpose of increasing the dissolved oxygen (DO) content of the water. A certain amount of dissolved oxygen is required for the life of fish and other aquatic organisms. Dissolved oxygen is also required to prevent the formation of offensive odors and to break down organic matter in water. The biochemical oxygen demand (BOD) is the measure of the amount of oxygen consumed in the biological processes which break down organic matter in water. A high BOD indicates that large amounts of organic waste are present and will use up large amounts of dissolved oxygen. Aeration apparatus are especially useful in increasing the amount of dissolved oxygen and, hence, are useful in high-BOD situations.

Aerators utilized in waste water treatment can be broadly classified into two types: a diffused air type, and a mechanical type. A diffused air type aerator introduces air or pure oxygen into water via submerged porous diffusers or nozzles. Mechanical type aerators agitate the water so as to promote solution of air from the atmosphere.

Mechanical type aerators are further classified as either surface aerators or turbine aerators. A surface aerator utilizes a submerged or partially submerged impeller which agitates the water vigorously to thereby entrain air in the water and cause a rapid change in the air-water interface. Turbine aerators generally utilize a rotating impeller which is disposed a certain distance below the surface of the water being treated. A draft tube is supported generally coaxial with the axis of rotation of the impeller and is utilized to supply air to the liquid adjacent the impeller.

SUMMARY OF THE INVENTION

The present invention is directed to an apparatus for mixing a gas and a liquid, such as water. The apparatus is comprised of a hollow outer tube and a hollow inner tube received coaxially within the outer tube. The inner tube is mounted for rotary motion within the hollow interior of the outer tube. A motor is attached to the outer tube adjacent a first end thereof and is drivingly coupled to a first end of the inner tube. The inner tube has a section which extends beyond the second end of the outer tube. A propeller is attached to this section of the inner tube for rotation therewith. The propeller is adapted to be placed in a liquid and to propel the liquid in which the propeller rotates. An inlet is formed in the inner tube for admitting a gas to the hollow interior of the inner tube. A diffusion tube forms a portion of the inner tube and extends beyond the propeller. The diffusion tube has a hollow interior which forms a portion of the hollow interior of the inner tube. The diffusion tube also has an open end for injecting a gas passing through the hollow interior of the inner tube into a liquid in which the propeller is placed. The diffusion tube has a length which is at least fifty percent of the transverse dimension of the propeller.

In the preferred embodiment, a housing encircles the motor. The housing thus forms an air inlet plenum around the motor. Apertures are formed in the top of the housing to admit air into the air inlet plenum. The air drawn into the air inlet plenum thereafter passes into the interior of the inner tube and is injected into the water within which the propeller is driven. The air which is injected into the liquid is thus preheated as it passes the motor.

A shield is attached to the outer surface of the outer tube adjacent the propeller. The shield prevents the formation of a vortex in the liquid when the propeller is rotating. If a vortex were to form while the propeller was rotating, the efficiency with which the air would be mixed in the liquid would decrease.

The inner tube has a cylindrical wall which is aligned along its axis to better than fifteen thousandths of an inch along the entire length of the cylindrical wall. The first end of the inner tube is coupled to a drive shaft of the motor through a flexible joint which permits universal motion. By utilizing the flexible joint in conjunction with the critical alignment tolerances of the cylindrical wall, vibration and shearing of the inner tube has been reduced.

Various advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

FIG. 1 is a side elevational view illustrating an apparatus in accordance with the present invention disposed within a liquid.

FIG. 2 is a partial side elevational and partial sectional view of the apparatus.

FIG. 3 is a sectional view of the lower end of the apparatus on an enlarged scale.

FIG. 4 is a view illustrating a U-joint attached to an end of the inner tube on an enlarged scale.

FIG. 5 is an end elevational view of a motor adapter.

FIG. 6 is a view taken along lines 6—6 of FIG. 5.

FIG. 7 is a perspective view illustrating the motor adaptor connected to the outer tube.

FIG. 8 is a perspective view illustrating the lower end of the apparatus.

FIG. 9 is a plan view of the lower end of the apparatus.

FIG. 10 is a fragmentary cross-sectional view of the inner and outer tubes of the apparatus.

FIG. 11 is a cross-sectional view taken along lines 11—11 of FIG. 4.

FIG. 12 is a cross-sectional view taken along lines 12—12 of FIG. 1.

DETAILED DESCRIPTION OF THE INVENTION

Referring to the drawings in detail, wherein like numerals indicate like elements, there is shown in FIG. 1 an apparatus in accordance with the present invention designated generally as 10. The apparatus 10 as shown in FIG. 1 is disposed within a liquid 12. The liquid 12 is generally waste water or sewage to which oxygen must be injected. A gas, generally ambient air, is shown entering the liquid 12 as a plurality of bubbles 14. The apparatus 10 is designed to be portable and is shown supported on a platform 15 by means of a suitable fastener 16 which is attached to an arm 18 extending from the apparatus 10. The apparatus 10 is shown supported in the liquid 12 at an angle 20 relative to the horizontal. The angle 20 is between the horizontal and the vertical. An angle of approximately 22° below horizontal has been found especially efficient for use in the treatment of shallow lagoons.

The apparatus 10 includes an outer tube means 22 and an inner tube means 24. The outer tube means 22 is comprised of a central tube 26, a motor adaptor 28 attached to a first or upper end of the central tube 26, and a bearing housing 30 attached to a second or lower end of the central tube 26. The inner tube means 24 includes a longitudinally extending tube 32, a propeller tube 34, and a diffusion tube 36.

The propeller tube 34 has a first end 38 whose outer diameter is less than the inner diameter of an end 40 of the tube 32. The end 38 thus can be received within the tube 32 and secured thereto by suitable means such as welding. The propeller tube 34 has a second end 42. As best seen in FIG. 3, the second end 42 has an outer diameter which is less than the outer diameter of a medial section 44 of the propeller tube 34. A shoulder 46 is thus formed at the juncture between the second end 42 and the medial section 44. A propeller 48 can thus be received about the second end 42 and abut against the shoulder 46. The lowermost portion of the second end 42 has a threaded exterior. The interior of one end of the diffusion tube 36 is threaded to mate with the threads on the exterior of the second end 42. The propeller 48 can thereby be held on the propeller tube 34 by threading the diffusion tube 36 onto the propeller tube 34 so that the propeller 48 is frictionally engaged between the shoulder 46 and the diffusion tube 36.

The motor adaptor 28 includes a cylindrical section 50 and a truncated cone section 52. The truncated cone section 52 is divided into a first section 54 and a second section 56. A plurality of ribs 58 are formed in the second section 56. A plurality of support arms 60 extend radially outward from the ribs 58. A handle 62 also extends outwardly from the motor adaptor 28. The handle 62 is used as a grip to either carry or adjust the position of the apparatus 10.

A motor 61 is secured to the innermost holes 64 in the arms 60. A casing or housing 66 is attached to the outer holes 68 in the arm 60. The housing 66 includes a circumferential wall 70 which completely encircles the motor 61 and a top wall 72. The top wall 72 has a plurality of holes or slots 74. The slots or holes 74 provide an air inlet for air to be drawn into the interior of the housing 66. The housing 66 forms a plenum 78 around the motor 61. The motor 61 has a fan section 80 which includes a fan for drawing air across the outer surface of the motor 61 in order to keep the motor 61 cool. The movement of the air into and through the plenum 78 is illustrated by arrows 76.

Air as it passes through the plenum 78 is heated by the motor 61. The air passes from the plenum 78 to the hollow interior of the motor adaptor 28. The motor adaptor 28 also forms an enclosed plenum so that the air is confined to move down the hollow interior of the outer tube means 22. Inlet means, such as air inlet slots 82, are formed in the tube 32 adjacent its first or upper end. As shown by arrows 84, the heated air which is moving down the hollow interior of the outer tube means 22 passes into the hollow interior of the inner tube means 24 via the air inlet slots 82. Only one air inlet slot 82 is shown in FIGS. 2 and 4, however, preferably at least two air inlet slots 82 are formed in the tube 32. As will be explained more fully hereinafter, the heated air thereafter passes downwardly through the tube 32 and out the open end of the diffusion tube 36.

The inner tube means 24 is supported within the outer tube means 22 at one of its ends by a flexible coupling, such as a U-joint 86. The other end of the inner tube means 24 is supported in a water bearing 88 which is secured within the bearing housing 30. The U-joint 86 couples one end of the tube 32 to a rotary-driven drive shaft 90 of the motor 61, while the water bearing 88 permits the rotation of the entire inner tube means 24. The axis of the inner tube means 24 is shown as arrow 92.

The U-joint 86 includes an upper yoke 94 coupled to a lower yoke 96 by means of a crosshead 98. The upper yoke 94 has a head section 100 with a central bore 102 extending therein. The drive shaft 90 of the motor 61 is secured within the bore 102 to transmit the rotary motion of the drive shaft 90 to the U-joint 86. The upper yoke 94 also includes a pair of opposing arms 104, 106. The arm 104 has a hole 109 extending through it and the arm 106 has a hole 111 extending through it. The crosshead 98 includes a first fin 108 with opposite ends 113, 115. The end 113 is pivotably supported in the hole 109 and the end 115 is pivotably supported in the hole 111. The lower yoke 96 has a head section 110 with a bore 112 extending therein. The upper end of the tube 32 is secured within the bore 112 so that the rotation of the yoke 86 is transmitted to the tube 32. The yoke 96 also includes a pair of opposing arms 114, 116. The arm 114 has a hole 118 extending through it and the arm 116 has a hole 120 extending through it. The crosshead 98 includes a second pin 126 with opposite ends 122, 124. The end 122 is pivotably supported in the hole 118 and the end 124 is pivotably supported in the hole 120. Clips 128 hold the ends 113, 115, 122, 124 in the respective holes 109, 111, 118, 120. The lower yoke 96 and the upper end of the tube 32 attached thereto are thus capable of pivoting about transverse axes 130, 132 of the pins 108, 126. The U-joint 86 permits universal motion of the first or upper end of the tube 32 while transmitting rotary motion from the drive shaft 90 to the tube 32.

As best seen in FIG. 12, the water bearing 88 includes a plurality of bearing bars 134 extending along its length. The bearing bars 134 are so disposed that a gap 136 exists between adjacent bars 134. When the water bearing 88 is placed in a liquid such as water, the water is permitted to flow in the gaps 136 and also between the outer circumference of the propeller tube 34 and the bars 134. Water thus acts as a lubricant between the propeller tube 34 and the bearing 88.

The tube 32 is mechanically straightened to exact tolerances. The tube 32 is straightened so that the cylindrical wall 138 of the tube 32 is aligned about the axis 92 a certain distance 140 to a tolerance of better than fifteen thousandths of an inch. That is, the distance 140 is the same throughout the entire length of the tube 32 to a tolerance better than fifteen thousandths of an inch. Applicant has discovered that when the tube 32 is straightened to a tolerance of only fifteen thousandths of an inch, vibration and whipping of the tube 32 occurs such that early breakage of the tube 32 results. Applicant has discovered that straightening the tube 32 to a tolerance of ten thousandths of an inch, that is, dynamically balancing the shaft to one ounce-inch at 3,450 r.p.m., essentially eliminates the problem of vibration of the tube 32. Applicant, however, believes that straightening the tube 32 to a tolerance better than fifteen thousandths of an inch would also essentially eliminate or alleviate the problem of vibration. The use of a flexible coupling, such as U-joint 86, together with the above critical tolerances, further aids in eliminating vibration. The problem of vibration in aeration apparatus of the type disclosed herein results in shearing or breaking of an inner tube means after only a relatively short period of operation.

A plurality of fins 142 extend radially outward from the bearing housing 30. Each fin 142 has a distal end 144. A vortex shield 146 is attached to a number of the distal ends 144. The shield 146 has a lengthwise dimension extending generally parallel to the axis 92 and a circumferential dimension extending in an arc less than 360°. As best seen in FIG. 8, the shield 146 has a lower end 148 in a generally truncated-V configuration. A portion of the lower end 148 extends above the propeller 48. The shield prevents the formation of a vortex adjacent the propeller in the liquid in which the propeller is driven. Without the shield 146, a vortex of liquid may form at the propeller and, hence, decrease the efficiency at which the propeller moves the liquid.

The apparatus 10 operates in the following manner. The apparatus 10 is disposed in a liquid 12 at an angle 20 relative to the horizontal. The liquid 12 is generally sewage or waste water which contains organic material and which requires a high level of dissolved oxygen. The motor 61 is driven preferably by an electrical source (not shown). The drive shaft 90 of the motor 61 is thereby rotated and the rotary motion is transferred to the inner tube means 24. The propeller 48 rotates in the liquid 12 and propels the liquid 12 by the open end of the diffusion tube 36. The liquid moving by the open end of the diffusion tube 36 creates a venturi or suction effect which draws air down through the hollow interior of the inner tube means 24. The air which is drawn through the hollow interior of the inner tube means 24 was preheated while passing through the plenum 78. The preheating of the air is desirable when the apparatus 10 is used as an aerator in bodies of water in northern climes wherein the body of water generally freezes over in the winter. By utilizing the preheated air, at least a portion of the body of water can be kept unfrozen or open. The unfrozen portion of the water thus provides a contact surface with the ambient air wherein the air can dissolve into the water. If the body of water is completely frozen over, such air-water contact is lost.

The diffusion tube 36 has a length which is at least fifty percent of the transverse dimension of the propeller 48. The transverse dimension of the propeller 48 is indicated as line 150 which lies in a plane passing through the propeller and perpendicular to the axis 92. By utilizing a diffusion tube 36 that extends below the propeller by a length of at least fifty percent of the transverse dimension 150 of the propeller 48, the air bubbles 14 are released into the liquid 12 a sufficient distance away from the propeller 48 so that the propeller 48 moves through liquid which does not contain bubbles 14. This increases the efficiency with which the propeller 48 propels the liquid 12. If the diffusion tube 36 were too short, the bubbles 14 would be released too close to the propeller 48 and thereby become inter- mixed with the liquid through which the propeller 48 was being driven. In such a condition, less liquid would be moved by the end of the diffusion tube 36 and the efficiency of the aeration process would be decreased. A three-inch propeller tube used with a five-inch propeller has been found satisfactory.

The open end of the diffusion tube 36 has a curved inner circumferential surface 39. See FIG. 3. For reasons unknown, it has been found that the air bubbles 14 disperse over a larger area when the inner circumferential surface of the open end of the diffusion tube 36 is curved than when the inner circumferential area is straight. As mentioned above, the shield 146 prevents the formation of a vortex of liquid at the propeller 48 and, hence, also increases the efficiency of the apparatus. When the apparatus 10 is disposed at an angle 20 within the liquid 12, the liquid 12 moved by the propeller 48 also aids in dispersing the air bubbles 14 over a large area in the liquid 12.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent extended by the broad general meaning of the terms in which the appended claims are expressed.

What is claimed:

1. An apparatus for mixing a gas and a liquid comprising:
    an outer housing having a hollow interior, opposite first and second ends and a longitudinal dimension extending between the two ends;
    inner tube means for defining an air inlet passage;
    said inner tube means being mounted for rotary motion about its axis within the hollow interior of said outer housing;
    motor means attached to said outer housing adjacent the first end thereof and drivingly coupled to a first end of said inner tube means for rotating said inner tube means;
    a second end of said inner tube means being open and having a section extending beyond the second end of said outer housing;
    a propeller attached to said section of inner tube means for rotation therewith, said propeller being adapted to be placed in a liquid and to propel the liquid through which the propeller rotates;
    inlet means for admitting a gas into said inner tube means, and said second end of said inner tube means being below said propeller whereby the liquid propelled by said propeller passes said second end of said inner tube means to aspirate gas therethrough; and
    means for preventing the formation of a vortex above said propeller in liquid being propelled by said propeller, when said inner tube means is disposed at an acute angle relative to the horizontal, said last-mentioned means including a shield attached to an outer surface of the outer housing adjacent its second end and extending over a portion of the outer surface of said outer housing, and said shield having a portion over said propeller.

2. An apparatus in accordance with claim 1 including a plurality of arms extending radially from said housing at its first end, said motor means including a motor and a drive shaft extending from said motor, means for attaching said motor to said arms, said drive shaft having an axis substantially in alignment with the axis of said inner tube means, said motor being adapted to rotate said drive shaft about its axis, coupling means drivingly coupling said drive shaft to said inner tube means for transfering the rotary motion of said drive shaft to said inner tube means while permitting universal motion of the first end of said inner tube means.

3. An apparatus in accordance with claim 2 including a motor housing attached to said outer housing adjacent its first end, said motor housing encircling said motor, said motor housing forming an inlet plenum around said motor, inlet apertures through said motor housing to allow gas surrounding said motor housing to enter said inlet plenum, said inlet plenum being in communication with the hollow interior of said outer housing and with said inlet means of said inner tube means whereby the gas passing through said inlet plenum is heated by said motor and thereafter enters the hollow interior of said inner tube means.

4. An apparatus in accordance with claim 1 wherein said inner tube means includes a cylindrical wall aligned along the axis of the inner tube means to within a tolerance of ten thousandths of an inch along its entire length, said cylindrical wall extending along substantially the entire length of said inner tube means, and said motor means includes a motor attached to said outer housing adjacent the first end thereof and a drive shaft extending from said motor, and a U-joint drivingly coupling said drive shaft to the first end of said inner tube means while permitting universal motion of the first end of said inner tube means at said coupling.

5. An apparatus in accordance with claim 1 including a plurality of support members extending from an outer surface of said outer housing adjacent the second end of said outer housing, and said shield being attached to said support members whereby said shield is held in a spaced relationship from the outer surface of said outer housing.

6. An apparatus in accordance with claim 1 wherein said shield has opposite ends and a lengthwise dimension extending generally in the direction of the longitudinal dimension of said outer housing between said opposite ends of said shield, one of the ends of said shield being disposed adjacent said propeller, said last-mentioned end having a generally truncated V-shaped configuration.

7. An apparatus for mixing a gas and a liquid comprising:
 an outer housing having a hollow interior, opposite first and second ends, and a longitudinal dimension extending between the ends;
 inner tube means for defining an inlet passage for air;
 said inner tube means being mounted for rotary motion about its axis within the hollow interior of said outer housing;
 motor means attached to said housing adjacent the first end thereof and drivingly coupled to a first end of said inner tube means for rotating said inner tube means;
 said inner tube means having a section extending beyond the second end of said outer housing;
 a propeller attached to said section of the inner tube means for rotation therewith, said propeller having a transverse dimension in a plane passing through said propeller and generally perpendicularly through the axis of said inner tube means, said propeller being adapted to be placed in a liquid and to propel the liquid in which the propeller rotates;
 inlet means for admitting a gas into said inner tube means, said inlet means being formed in said inner tube means;
 a diffusion tube forming a portion of said section of said inner tube means which extends beyond the second end of said housing, said diffusion tube extending beyond said propeller, said diffusion tube having an open end at the second end of said inner tube means forming an outlet from said diffusion tube for injecting a gas passing through said inner tube means into a liquid in which the propeller is placed, said diffusion tube having a length at least fifty percent of the length of the transverse dimension of the propeller to dispose said open end of said diffusion tube a distance away from said propeller at least fifty percent of the length of the transverse dimension of the propeller whereby the propeller can rotate through a liquid substantially free of gas bubbles injected into the liquid through the open end of said diffusion tube when the axis of said inner tube means is disposed at an acute angle relative to the horizontal; and
 means for preventing the formation of a vortex above said propeller in liquid being propelled by said propeller when said inner tube means is disposed at an acute angle relative to the horizontal, said last-mentioned means including a shield attached to an outer surface of the outer housing adjacent its second end and extending over a portion of the outer surface of said outer housing immediately above the propeller.

8. An apparatus in accordance with claim 7 wherein the open end of said diffusion tube has a curved inner circumferential surface.

9. An apparatus for mixing a gas and a liquid comprising:
 an outer housing having a hollow interior, opposite first and second ends, and a longitudinal dimension extending between the ends;
 inner tube means for defining an inlet passage for air;
 said inner tube means being mounted for rotary motion about its axis within the hollow interior of said outer housing;
 motor means attached to said outer housing adjacent the first end thereof and drivingly coupled to a first end of said inner tube means for rotating said inner tube means;
 said inner tube means having a section extending beyond the second end of said outer housing;
 a propeller attached to said section of the inner tube means for rotation therewith, said propeller having a transverse dimension in a plane passing through said propeller and generally perpendicularly through the axis of said inner tube means, said propeller being adapted to be placed in a liquid and to propel the liquid in which the propeller rotates;
 inlet means for admitting a gas into said inner tube means, said inlet means being formed in said inner tube means;
 a diffusion tube forming a portion of said section of said inner tube means which extends beyond the second end of said housing, said diffusion tube extending beyond said propeller, said diffusion tube having an open end at the second end of said inner tube means forming an outlet from said diffusion tube for injecting a gas aspirated through said inner tube means into a liquid in which the propeller is placed, said aspiration being caused by liquid propelled past said open end by the rotation of said propeller, said diffusion tube having a length at least fifty percent of the length of the transverse dimension of the propeller to dispose said open end of said diffusion tube a distance away from said propeller at least fifty percent of the length of the transverse dimension of the propeller whereby the propeller can rotate through a liquid substantially free of gas bubbles injected into the liquid through the open end of said diffusion tube when the axis of said inner tube means is disposed at an acute angle relative to the horizontal; and means for preventing the formation of a vortex in the liquid above the propeller, said vortex prevention means including a shield attached by a plurality of fins to said outer housing adjacent its second end, said fins extending radially from the outer surface of said outer housing adjacent its second end, each fin having a distal end, said shield having a curvilinear configuration and an inner surface attached to the distal ends of said fins to hold said shield in a spaced relationship from said outer housing, said shield having opposite ends and a lengthwise dimension extending between the ends generally in the direction of the longitudinal dimension of said outer housing and a circumferential dimension extending in an arc less than 360° generally around the longitudinal axis of said inner tube means, one of the ends of said shield extending over said propeller.

* * * * *